(12) United States Patent
Stretton

(10) Patent No.: US 7,861,513 B2
(45) Date of Patent: Jan. 4, 2011

(54) AEROENGINE VENTILATION SYSTEM

(75) Inventor: Richard G. Stretton, Loughborough (GB)

(73) Assignee: Rolls-Royce PLC, London (GB)

( * ) Notice: Subject to any disclaimer, the term of this patent is extended or adjusted under 35 U.S.C. 154(b) by 935 days.

(21) Appl. No.: 11/783,996

(22) Filed: Apr. 13, 2007

(65) Prior Publication Data

US 2007/0245711 A1    Oct. 25, 2007

(30) Foreign Application Priority Data

Apr. 20, 2006  (GB) .................................. 0607794.5

(51) Int. Cl.
*F02K 3/02*    (2006.01)
(52) U.S. Cl. .................... 60/226.1; 60/262; 60/782; 60/728; 60/785; 60/806; 60/266; 60/267; 60/39.83
(58) Field of Classification Search ................ 60/226.1, 60/262, 782, 728, 785, 806, 266, 267, 39.83
See application file for complete search history.

(56) References Cited

U.S. PATENT DOCUMENTS

| | | | | | |
|---|---|---|---|---|---|
| 5,706,649 | A | * | 1/1998 | Robinson et al. | 60/226.2 |
| 5,729,969 | A | * | 3/1998 | Porte | 60/226.1 |
| 5,778,659 | A | * | 7/1998 | Duesler et al. | 60/226.1 |
| 2008/0006022 | A1 | * | 1/2008 | Schwarz et al. | 60/204 |

FOREIGN PATENT DOCUMENTS

| | | |
|---|---|---|
| GB | 2 194 592 A | 3/1988 |
| GB | 2 208 702 A | 4/1989 |
| GB | 2 224 080 A | 4/1990 |

* cited by examiner

*Primary Examiner*—Michael Cuff
*Assistant Examiner*—Craig Kim
(74) *Attorney, Agent, or Firm*—Oliff & Berridge, PLC

(57) ABSTRACT

A gas turbine engine comprising a ventilation zone defined between a core engine casing and a core fairing and having a discharge nozzle, the engine further comprises a pre-cooler having a flow of coolant therethrough and which coolant being ducted into the ventilation zone wherein an additional ventilation zone outlet system is provided and comprises a variable area outlet.

18 Claims, 3 Drawing Sheets

AEROENGINE VENTILATION SYSTEM

The present invention relates to an aeroengine comprising a heat exchanger and a system for recovering thrust from the cooling airflow through the heat exchanger.

For fancase mounted engines having with a pre-cooler or heat exchanger, a conventional approach to exhausting coolant is to simply eject the coolant into a ventilation zone between aft engine cases and an inner fixed structure of a nacelle.

Whilst ejecting pre-cooler coolant in to the ventilation zone is relatively simple it does create significant problems. The ventilation zone outlet, usually annular or part annular, must be sized to accommodate a maximum flow rate of a combined ventilation flow and the highest pre-cooler flow. This has the disadvantage that at aircraft cruise, when the pre-cooler is not operating, it is not possible to recover thrust from the ventilation zone air because the vent is effectively over-sized. This loss of potential thrust is compounded by a drag penalty because the vent outlet becomes an aerodynamic step or discontinuity when it is not passing full flow. Another disadvantage is the extra heat input in to the zone requiring considerable shielding and heat resistant cabling etc for core engine mounted systems.

Therefore it is an object of the present invention to provide an exhaust system that produces thrust from the ventilation zone flow and/or pre-cooler flow at most engine operating conditions.

In accordance with the present invention a gas turbine engine comprises a gas turbine engine comprising a ventilation zone defined between a core engine casing and a core fairing and having a discharge nozzle, the engine further comprises a pre-cooler having a flow of coolant therethrough and which coolant being ducted into the ventilation zone characterised in that an additional ventilation zone outlet system is provided and comprises a variable area outlet.

Preferably, the outlet is defined in a bifurcation duct.

Alternatively, the or a further outlet is defined in an outer wall of a nacelle.

Preferably, the additional ventilation zone outlet system comprises convergent walls leading to the variable area outlet.

Preferably, the nozzle is convergent and is accordingly sized for discharging ventilation flow D.

Preferably, the variable area outlet is defined by a door rotatable between a closed position and an open position.

Alternatively, the variable area outlet is defined by a door slidable between a closed position and an open position.

Alternatively, the variable area outlet is defined by a series of louvers rotatable between a closed position and an open-position.

Preferably, the area of the variable area outlet is controlled by an actuator.

According to another aspect of the present invention a method of operating a gas turbine engine comprising a ventilation zone defined between a core engine casing and a core fairing and having a discharge nozzle, the engine further comprises a pre-cooler having a flow of coolant therethrough and which coolant being ducted into the ventilation zone wherein an additional ventilation zone outlet system is provided and comprises a variable area outlet; the method comprising the step of adjusting the variable area outlet dependent on the amount of coolant being ducted into the ventilation zone.

Preferably, the area of the variable area outlet is increased when the amount of coolant being ducted into the ventilation zone increases.

Preferably, the area of the variable area outlet is adjusted so that the outlet operates to produce thrust from an airflow from the ventilation zone.

Preferably, the area of the variable area outlet is adjusted so that the nozzle operates to produce thrust from at least a ventilation airflow.

The present invention will be more fully described by way of example with reference to the accompanying drawings in which.

Figure 1:
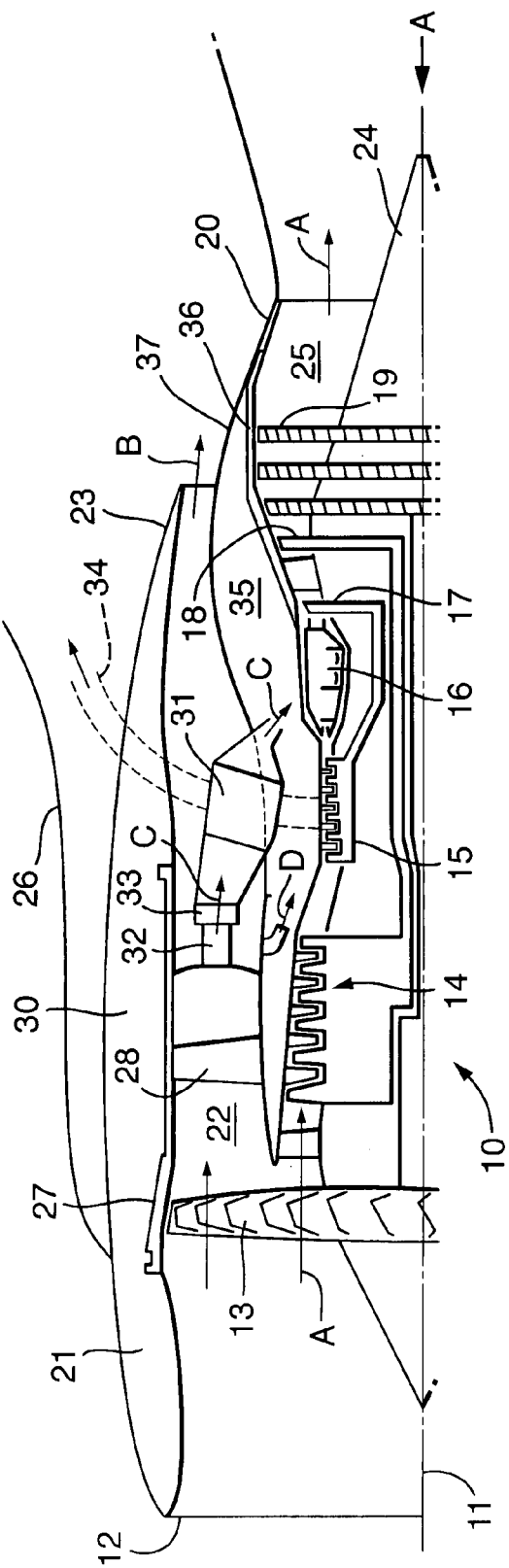
FIG. 1 is a schematic section of part of a conventional ducted fan gas turbine engine.
Figure 3:
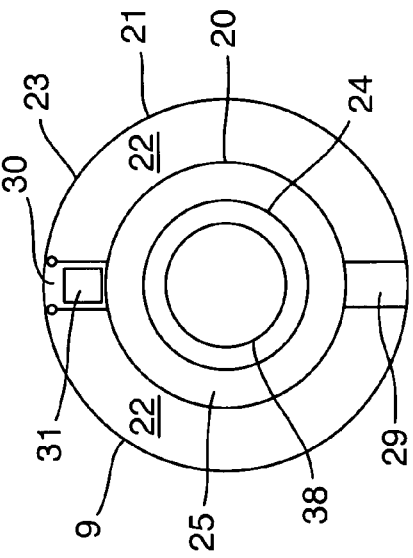
FIG. 3 is a view on A in FIG. 1.
Figure 2:
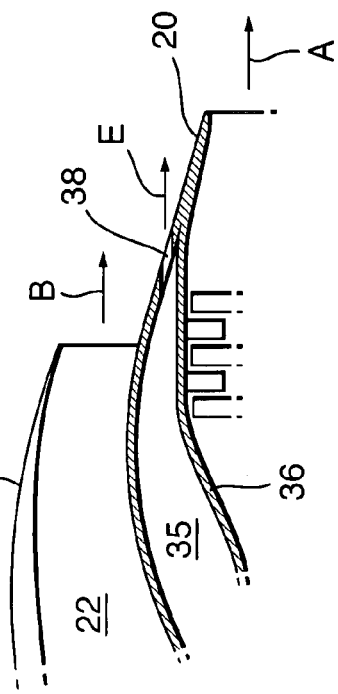
FIG. 2 is an enlarged section through a rear portion of the engine of FIG. 1.

With reference to FIGS. 1, 2 and 3, a ducted fan gas turbine engine generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core exhaust nozzle 20. A nacelle 21 generally surrounds the engine 10 and defines the intake 12, a bypass duct 22 and an exhaust nozzle 23. A centre-body 24 together with the core exhaust nozzle 20 define a core duct 25.

The gas turbine engine 10 works in the conventional manner so that air entering the intake 11 is accelerated by the fan 13 to produce two air flows: a first airflow A into the intermediate pressure compressor 14 and a second airflow B which passes through a bypass duct 22 to provide propulsive thrust. The intermediate pressure compressor 14 compresses the airflow A directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust (airflow B). The high, intermediate and low-pressure turbines 17, 18, 19 respectively drive the high and intermediate pressure compressors 15, 14 and the fan 13 by suitable interconnecting shafts.

The fan 13 is circumferentially surrounded by a structural member in the form of a fan casing 27, which is supported by an annular array of outlet guide vanes 28.

The nacelle 21 comprises two generally C-shaped ducts 9 that are rotatably mounted to an engine pylon 26 which connects the engine 10 to a wing or a fuselage of an aircraft. During maintenance of the engine or its accessories, mounted on the fan casing 27 or core engine, the C-shaped ducts 9 are swung open in a conventional manner. When closed the C-shaped ducts 9 form two generally C-shaped bypass ducts 22, having a lower bifurcation duct 29 at bottom dead centre of the engine 10, and an upper bifurcation duct 30.

A pre-cooler or heat exchanger 31 is positioned within the upper bifurcation duct 30 and ducting 32 is provided to draw a part of airflow B through the heat exchanger 31 (airflow C). Typically a controllable valve 33 is positioned to regulate the flow through the duct 32. Compressor air is bled from the high pressure compressor 15 (alternatively the intermediate compressor 14), through a conduit 34 which passes through the heat exchanger 31 where it is sufficiently cooled to be used as aircraft cabin air or anti-icing air. The ducting 32 then directs the airflow C into a ventilation zone 35 defined between an engine core casing 36 and radially outwardly a core engine fairing 37.

The ventilation zone 35 is vented via an airflow D drawn off the fan bypass duct 22. Ventilation is required in this zone for fire prevention and accessory cooling. Typically more than one airflow D is provided around the circumference of the engine.

Conventionally, airflows C and D are vented via a nozzle 38 (airflow E) formed in the aft part of the core engine fairing 37. The ventilation zone 35 nozzle 37, usually annular or part annular, must be sized to accommodate a maximum flow rate of the combined ventilation flow and the highest pre-cooler flow (airflows C and D). Where both airflows C and D are at a maximum some thrust recovery is possible. However, this system is disadvantaged, particularly at aircraft cruise and when the pre-cooler is either at low or zero operation, it is not possible to recover thrust from the ventilation zone air because the vent nozzle 38 is effectively over-sized. This loss of potential thrust is compounded by a drag penalty because the vent outlet nozzle 38 becomes an aerodynamic step or discontinuity in the fairing 37 when it is not passing full flow.

Figure 4:
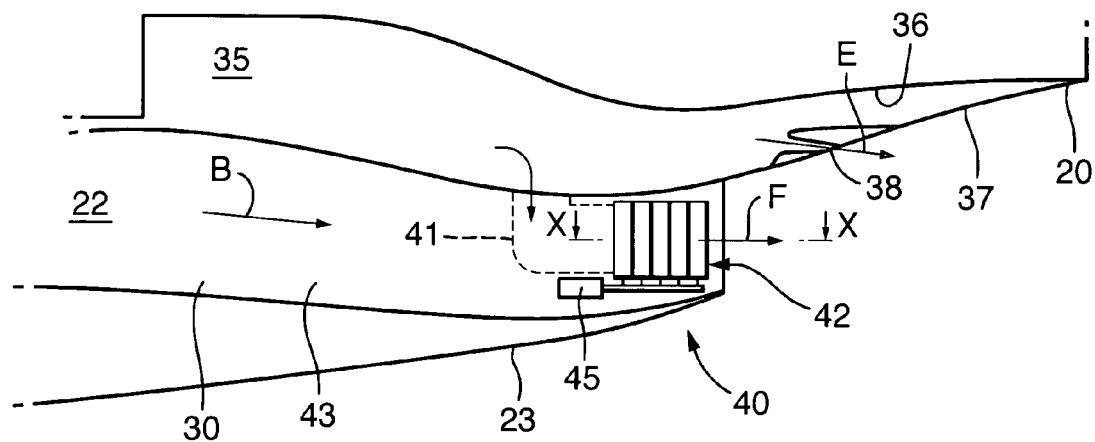
FIG. 4 is a view of the lower part of a gas turbine engine incorporating a first embodiment of the present invention.
Figure 4A:
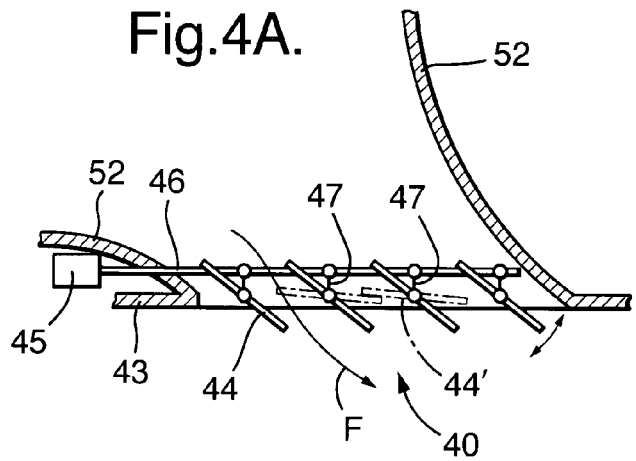
FIGS. 4A, 4B and 4C are sections along X-X in FIG. 4 and show details of the present invention.
Figure 4B:
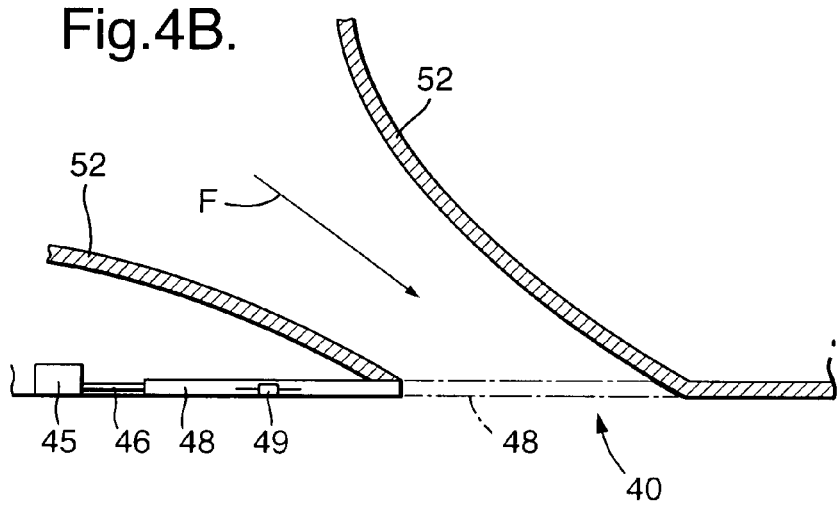

Referring now to FIGS. 4, 4A and 4B, the present invention is realised by the provision of at least one additional ventilation zone outlet system 40. In this first embodiment, the outlet system 40 comprises a conduit 41 connecting the ventilation zone 35 to a variable area outlet 42. The variable area outlet 42 is arranged in a wall 43 of the lower bifurcation duct 29; however, it is also possible for the variable area outlet 42 to be arranged in a wall of the upper bifurcation duct 30 or core fairing 37. In FIG. 4A, the variable area outlet 42 comprises a series of louvers 44 rotatably mounted to the bifurcation duct 29. A controllable actuator 45 is connected via a rod 46 and links 47 to the louvers 44 to rotate them.

In a similar embodiment (FIG. 4B) the louvers 44 are replaced by a simple slidable door 48 mounted on guide rails 49 and driven by the actuator 45 mechanism. Here and in the FIG. 4A embodiment walls 52 defining the outlet 38 are convergent in order to accelerate the gas flow for useful thrust.

Figure 4C:
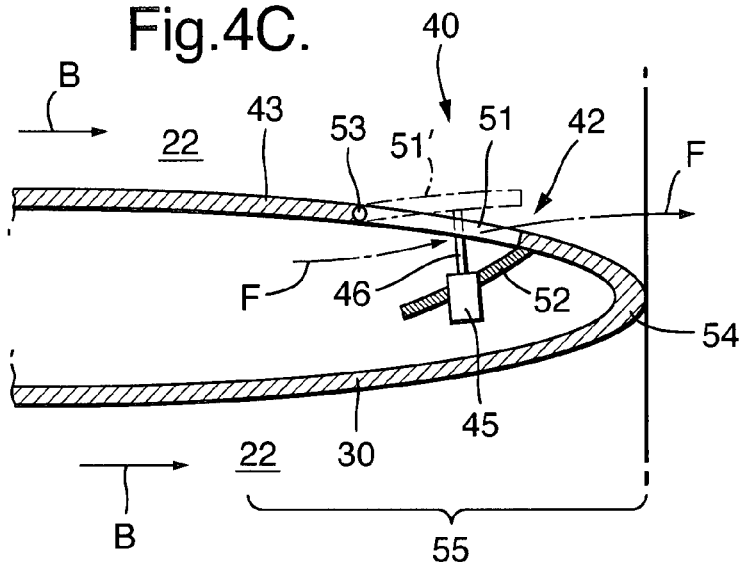

Referring to FIG. 4C, which shows the complete cross-section X-X through the lower bifurcation duct 30; the at least one additional ventilation zone outlet system 40 comprises a variable area outlet 42 in the form of a door 51, rotatable via an actuator mechanism 45, 46 between closed and open positions 51, 51'. The door 51 is arranged with its rotatable hinge 53 upstream and is generally positioned towards the downstream end 54 of the lower bifurcation duct 30. This is where the airflow B is at its lowest pressure within the bypass duct 22. Furthermore, the position of the door 51 is within a tapering part 55 of the downstream end 54 of the lower bifurcation duct 30. Thus as the duct 22 is divergent at this location, further pressure loss is present. It is an advantage for the variable area outlet 42 to be positioned where the passing airflow B is at a lowest possible pressure, and therefore the greatest pressure difference is experienced across the additional ventilation zone outlet system 40, improving flow characteristics and optimising thrust recovery of airflow F. To further improve thrust recovery, a wall 52 is provided, which together with the rotatable door 51' in its open position creates a convergent nozzle for accelerating the airflow F.

Figure 5:
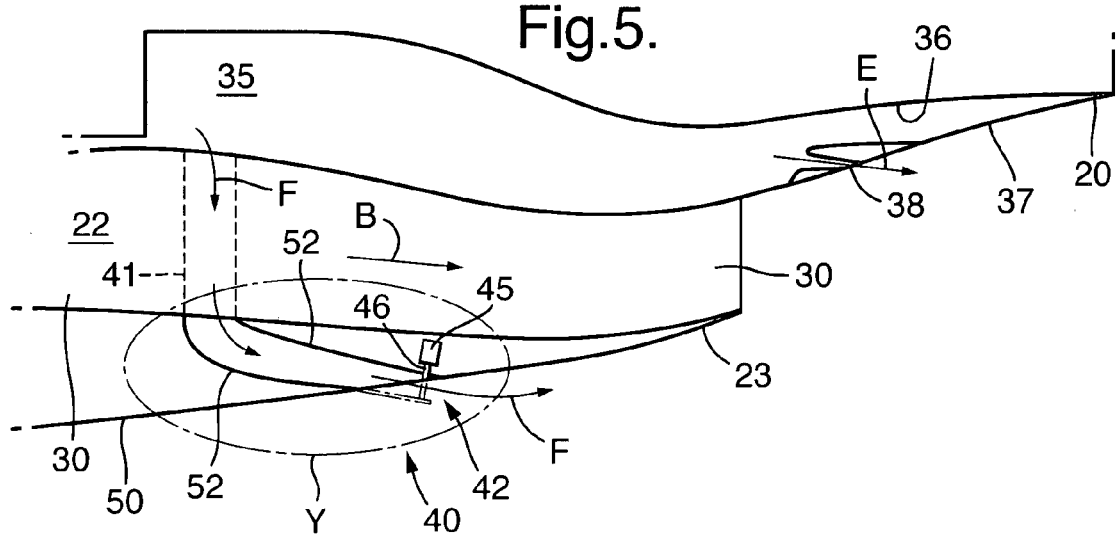
FIG. 5 is a view of the lower part of a gas turbine engine incorporating a second embodiment of the present invention.
Figure 5A:
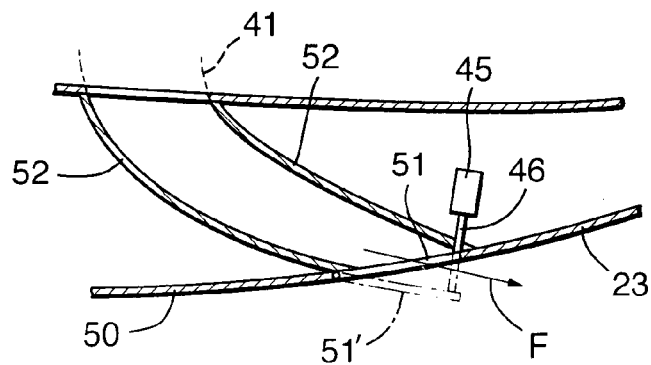
FIG. 5A is an enlarged view on Y in FIG. 5

Referring to FIGS. 5 and 5A, an alternative arrangement of the additional ventilation zone outlet system 40 is to route the ducting 41 through the bifurcation duct 30 and into the nacelle 21. In this case, the variable area outlet 42 is positioned on an outer surface 50 of the nacelle 21. Preferably the variable area outlet 42 is located in a region of the outer nacelle surface 50 where there is the least static pressure. Generally, this low static pressure region is to the rearward part of the nacelle 21, where the nacelle outer surface 50 curves radially inwardly.

The variable area outlet 42 is defined by a door 51, rotatable between an open (51') and closed (51) position and controlled by an actuator 45 and connecting rod 46 housed in the nacelle 21. The ducting 41 is partly defined by walls 52, which are convergent towards the variable area outlet 42 so to accelerate the airflow F. The rotatable door 51, as with the other embodiments herein, is variably positioned by the controllable actuator 45, such that the outlet area is adjusted dependent on the amount of airflow F and useful thrust recovery is achieved.

This second embodiment may also be realised by the variable area outlet 42 comprising similar variable area mechanisms described with reference to FIGS. 4, 4A, 4B or 4C.

With reference to all embodiments described herein, an advantage of the additional ventilation zone outlet system 40 is that the ventilation nozzle 38 may be sized and arranged so that thrust is recovered from the ventilation airflow D. Thus when a variable quantity of airflow C from the pre-cooler 31 enters the ventilation zone additional outlet area is controlled so that the ventilation nozzle 38 area is operating at its optimum point and the additional pre-cooler airflow also provides useful thrust via the variable area outlet 42.

Accordingly, the present invention also encompasses a method of operating a gas turbine engine 10 comprising a ventilation zone 35 defined between a core engine casing 36 and a core fairing 37 and having a discharge nozzle 38, the engine 10 further comprises a pre-cooler 31 having a flow of coolant therethrough and which coolant being ducted into the ventilation zone 35 wherein an additional ventilation zone outlet system 40 is provided and comprises a variable area outlet 42; the method comprising the step of adjusting the variable area outlet 42 dependent on the amount of coolant being ducted into the ventilation zone 35.

The method also included the step of increasing he area of the variable area outlet 42 when the amount of coolant is ducted into the ventilation zone 35, from the pre-cooler 31 increases. It should be appreciated that airflow F is not necessarily solely coolant airflow C, but that airflows C and D will mix, nonetheless, the quantity of airflow F will be approximately that of airflow C.

It is an important aspect of the present invention that the method of operating the variable area outlet 42 includes varying its area so that the outlet 42 operates to produce thrust from the airflow F from the ventilation zone 35. Furthermore, and by varying the outlet's area the nozzle 38 also operates to produce thrust from airflow E, which is approximately equivalent in quantity to ventilation airflow D.

I claim:

1. A gas turbine engine comprising a ventilation zone defined between a core engine casing and a core fairing and having a discharge nozzle, the engine further comprises a pre-cooler having a variable flow of coolant therethrough and which coolant being ducted into the ventilation zone wherein an additional ventilation zone outlet system is provided and comprises a variable area outlet, wherein the area of the variable area outlet is controlled by an actuator.

2. A gas turbine engine as claimed in claim 1 wherein the variable area outlet is defined in a bifurcation duct.

3. A gas turbine engine as claimed in claim 1 wherein the engine is surrounded by a nacelle; the variable area outlet or a further outlet is defined in an outer wall of the nacelle.

4. A gas turbine engine as claimed in claim 1 wherein the additional ventilation zone outlet system comprises convergent walls leading to the variable area outlet.

5. A gas turbine engine as claimed in claim 1 wherein the nozzle is convergent and is accordingly sized for discharging ventilation flow.

6. A gas turbine engine as claimed in claim 1 wherein the variable area outlet is defined by a door rotatable between a closed position and an open position.

7. A gas turbine engine as claimed in claim 1 wherein the variable area outlet is defined by a door slidable between a closed position and an open position.

8. A gas turbine engine as claimed in claim 1 wherein the variable area outlet is defined by a series of louvers rotatable between a closed position and an open position.

9. A method of operating a gas turbine engine comprising a ventilation zone defined between a core engine casing and a core fairing and having a discharge nozzle, the engine further comprises a pre-cooler having a variable flow of coolant therethrough and which coolant being ducted into the ventilation zone characterized in that an additional ventilation zone outlet system is provided and comprises a variable area outlet, wherein the area of the variable area outlet is controlled by an actuator; the method comprising the step of adjusting the variable area outlet dependent on the amount of coolant being ducted into the ventilation zone.

10. The method of claim 9 wherein the area of the variable area outlet is increased when the amount of coolant being ducted into the ventilation zone increases.

11. The method of claim 9 wherein the area of the variable area outlet is adjusted so that the outlet operates to produce thrust from an airflow from the ventilation zone.

12. The method of claim 9 wherein the area of the variable area outlet is adjusted so that the nozzle operates to produce thrust from at least a ventilation airflow.

13. A gas turbine engine as claimed in claim 1, wherein a quantity of ventilation airflow passes into the ventilation zone through a first inlet and the discharge nozzle provides thrust recovery of the ventilation airflow.

14. A gas turbine engine as claimed in claim 1, wherein the pre-cooler has a variable flow of coolant through the pre-cooler and the coolant is ducted into the ventilation zone through a second inlet.

15. A gas turbine engine as claimed in claim 14, further comprising an additional ventilation zone outlet system having a variable area outlet controllable to provide recovery from the variable flow of coolant.

16. The method of claim 9, wherein a quantity of ventilation airflow passes into the ventilation zone through a first inlet and the discharge nozzle provides thrust recovery of the ventilation airflow.

17. The method of claim 9, wherein the pre-cooler has a variable flow of coolant through the pre-cooler and the coolant is ducted into the ventilation zone through a second inlet.

18. The method of claim 17, wherein an additional ventilation zone outlet system is provided and comprises a variable area outlet controllable to provide recovery from the variable flow of coolant.

* * * * *